United States Patent [19]
Iida et al.

[11] Patent Number: 5,604,307
[45] Date of Patent: Feb. 18, 1997

[54] TIRE PRESSURE DROP ALARM DEVICE SENSING PARTIAL TRAVEL ON IRREGULAR ROAD SURFACE

[75] Inventors: Akiko Iida; Mikao Nakajima, both of Osaka; Hiroto Horie, Akashi, all of Japan

[73] Assignee: Sumitomo Rubber Industries, Ltd., Osaka, Japan

[21] Appl. No.: 593,370

[22] Filed: Jan. 29, 1996

[30] Foreign Application Priority Data

Feb. 1, 1995  [JP] Japan .................................. 7-015399

[51] Int. Cl.$^6$ .................................................. B60C 23/02
[52] U.S. Cl. ............................................. 73/146.2; 340/444
[58] Field of Search ........................... 73/146.2, 146.5; 340/444; 364/558

[56] References Cited

U.S. PATENT DOCUMENTS

| | | | |
|---|---|---|---|
| 3,691,524 | 9/1972 | Frost et al. | 340/444 |
| 4,876,528 | 10/1989 | Walker et al. | 340/444 X |
| 5,343,741 | 9/1994 | Nishihara et al. | |

FOREIGN PATENT DOCUMENTS

| | | | |
|---|---|---|---|
| 0489562 | 6/1992 | European Pat. Off. | 340/444 |
| 4337443 | 11/1993 | Germany . | |
| 4410941 | 3/1994 | Germany . | |
| 63-305011 | 12/1988 | Japan . | |
| 4-11844 | 1/1992 | Japan . | |
| 4-212609 | 8/1992 | Japan . | |
| 2191553 | 6/1987 | United Kingdom . | |

*Primary Examiner*—Sandra L. O'Shea
*Assistant Examiner*—Joseph L. Felber
*Attorney, Agent, or Firm*—Steven M. Rabin, P.C.

[57] ABSTRACT

A tire pressure drop alarm device for judging a pneumatic pressure drop by calculating rotational angular velocities of tires provided for a four-wheel vehicle. When the vehicle is traveling on a road which varies in condition between left and right sides, a front/rear ratio of rotational angular velocities of the tires at the shoulder side of the road changes more markedly than that of rotational angular velocities of the tires at the center side, and a large time differential value appears. Therefore, it is possible to judge the traveling condition of the vehicle when the road condition varies between left and right sides. When it is judged that the traveling condition of the vehicle encounters a road condition which varies between left and right sides, the tire rotation of the four wheels is likely to become unbalanced, giving a false alarm even if the tire pressure does not drop. In this case, the judgment by the pneumatic pressure drop judging means is inhibited to prevent an issuance of a false alarm.

16 Claims, 15 Drawing Sheets

F I G. 3
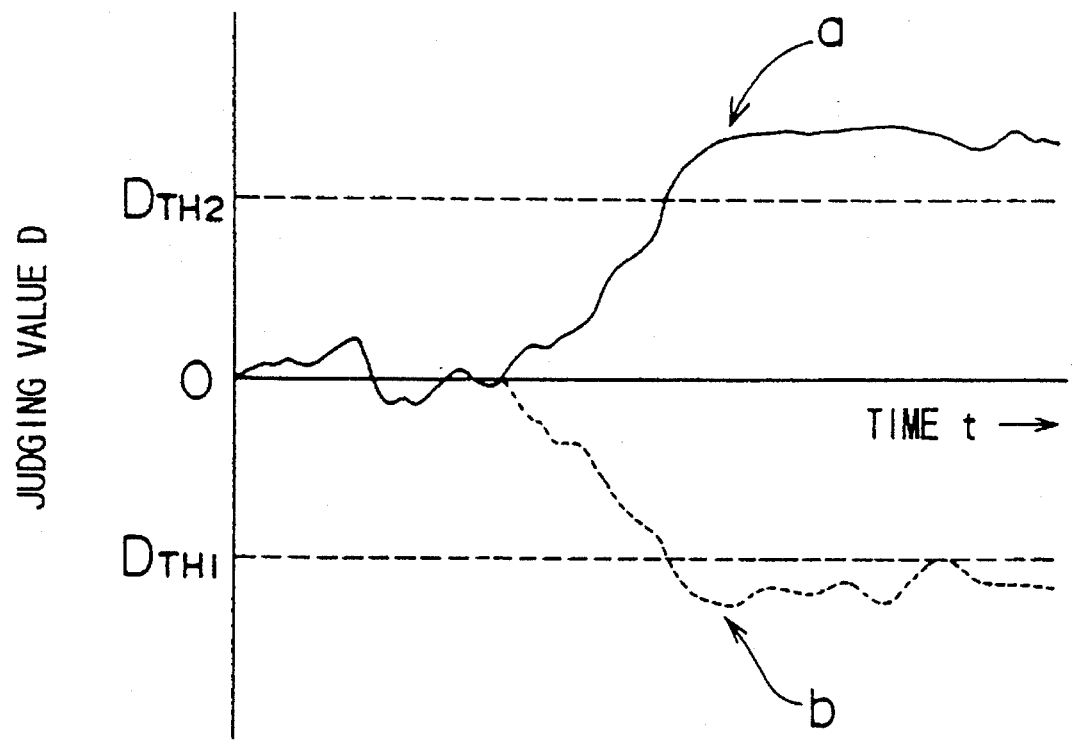

TIRE PRESSURE DROP ALARM DEVICE SENSING PARTIAL TRAVEL ON IRREGULAR ROAD SURFACE

BACKGROUND OF THE INVENTION

1. Field of the Invention

The present invention relates to a device for detecting a pneumatic pressure drop of tires of a four-wheel vehicle in order to give an alarm.

2. Related Background Art

As a safety device for a four-wheel vehicles such as automobiles and trucks, tire pressure drop detecting devices have recently been proposed, and some of them have been put to practical use.

A pneumatic pressure drop alarm device has been developed because its importance is recognized for the reason shown below. That is, when the pneumatic pressure is low, the temperature of a tire increases due to an increase of tire deflection. Therefore, the strength of the polymer material used for the tire is lowered and the tire is more likely to burst. However, even if the tire is deflated, the driver is often unaware of the deflation.

As a method of detecting a pneumatic pressure drop by the pneumatic pressure drop alarm device, for example, there is a method of utilizing a difference in respective rotational angular velocities $F_1$, $F_2$, $F_3$ and $F_4$ (referred to as a "rotational angular velocity $F_i$" hereinafter) of four tires $W_1$, $W_2$, $W_3$ and $W_4$ of the vehicle. (The tires $W_1$ and $W_2$ correspond to left and right front tires, and the tires $W_3$ and $W_4$ correspond to left and right rear tires, respectively. In addition, these are referred to as a "tire $W_i$" hereinafter.)

According to this method, the rotational angular velocity $F_i$ of the tire $W_i$ is detected every predetermined sampling period $\Delta T$, based on a signal to be generated by a wheel speed sensor mounted on the tire $W_i$. When the dynamic load radiuses (which mean apparent rolling radiuses of the respective tires calculated by dividing by $2\pi$ a travel distance of the vehicle while the tires make one free revolution) of the tires $W_i$ are the same, at the same time that the vehicle is traveling linearly, the rotational angular velocities $F_i$ are the same.

However, the dynamic load radius of the tire $W_i$ varies depending on the change in pneumatic pressure of the tire $W_i$. When the pneumatic pressure of the tire $W_i$ drops, the dynamic load radius becomes smaller than that at a normal internal pressure. Accordingly, the rotational angular velocity $F_i$ of the tire $W_i$ becomes higher than that at a normal internal pressure, thereby making it possible to detect the pneumatic pressure drop of the tire $W_i$, based on the difference in the rotational angular velocities $F_i$. A judging equation for detecting the pneumatic pressure drop of the tire $W_i$ is shown below (see Japanese Laid-Open Patent Publication Nos. 63-305011 and 4-212609).

$$D = 2[(F_1+F_4)-(F_2+F_3)]/(F_1+F_2+F_3+F_4) \qquad (1)$$

For example, if it is assumed that the dynamic load radiuses of the respective tires $W_i$ are the same, the rotational angular velocities $F_i$ are the same ($F_1=F_2=F_3=F_4$). Accordingly, the judging value D becomes 0. Then, threshold values $D_{TH1}$ and $D_{TH2}$ are set ($D_{TH1}$, $D_{TH2}>0$). When the following judging expression:

$$D<-D_{TH1} \text{ or } D>D_{TH2}$$

is satisfied, it is judged that the tire $W_i$ having a pneumatic pressure drop is present. When the judging expression is not satisfied, it is judged that the tire $W_i$ having a pneumatic pressure drop is not present. When it is judged that a tire $W_i$ has a pneumatic pressure drop, an alarm is given by using a display or a speaker.

In the pneumatic pressure drop detection processing at the time of actual traveling, when front/rear accelerations and left/right accelerations of the vehicle are large, for example, when the load transfers around the vehicle at the time of traveling with rapid acceleration or traveling around a curve, the driving tires are sometimes locked or idled, that is, the wheel is not rolling due to slippage or some other cause. Since the locking or idling does not always arise uniformly in left/right driving tires, revolution counts of the respective driving tires are different. As a result, D does not become equal to 0, thereby causing a wrong judgment of reduced pressure. Therefore, for example, there is disclosed a technique of removing the data corresponding to the rotational angular velocity $F_i$ in Japanese Utility Model Publication No. 4-11844.

In the technique as disclosed in Japanese Utility Model Publication No. 4-11844, when it is considered that the tire $W_i$ is in the idling or locking state, the rotational angular velocity $F_i$ to be calculated at that point is ignored in detecting whether the pneumatic pressure of the tire $W_i$ drops or not. More specifically, when it is judged that both ratios $F_1/F_2$ and $F_3/F_4$ of the rotational angular velocities $F_1$, $F_2$, $F_3$ and $F_4$ of the left and right front tires $W_1$ and $W_2$ as well as left and right rear tires $W_3$ and $W_4$ are not within a predetermined range, it is considered that the tire $W_i$ is in the state of one-wheel idling or locking, and the data of the rotational angular velocity $F_i$ is ignored.

In the above tire pressure drop detection technique, the rotational angular velocity $F_i$ calculated when both ratios $F_1/F_2$ and $F_3/F_4$ are not within the predetermined range is merely ignored. Therefore, as shown in FIG. 15, if it is judged only by the ratio $F_1/F_2$ or $F_3/F_4$ when the vehicle is traveling while one side thereof is running on an irregular road surface (e.g. a shoulder of a non-paved road such as grassy or sandy place, or a road side covered with snow) ("one-sided irregular road") because of a car on the opposite lane, causing idling little by little because the irregular road side is slippery, there is a possibility of a wrong judging value, since the above condition is not normally satisfied, at the time of traveling on the one-sided irregular road. Accordingly, there is a disadvantage in that the traveling data which is not suitable for the reduced pressure judgment are adopted, thereby giving a false alarm.

Consequently, it is impossible to judge accurately only by judging whether the left/right wheel ratios $F_1/F_2$ and $F_3/F_4$ are within the predetermined range or not, as disclosed in Japanese Utility Model Publication No. 4-11844.

SUMMARY OF THE INVENTION

An object of the present invention is to provide a tire pressure drop alarm device capable of inhibiting a judgment of the tire pressure drop by accurately judging the situation where the vehicle is traveling on an one-sided irregular road, thereby accurately detecting the tire pressure drop.

In order to accomplish the above object, the tire pressure drop alarm device of the present invention comprises operating means for determining a time differential value of a front/rear wheel ratio of rotational angular velocities of left tires and a time differential value of a front/rear wheel ratio of rotational angular velocities of right tires, and then determining a difference in or a ratio of the time differential values of the front/rear wheel ratios between left and right sides, and one-sided irregular road traveling judging means for judging a traveling condition which varies in road condition between left and right sides, based on the difference in or the ratio of the front/rear wheel ratios between left and right sides determined by the operating means, wherein the judgment by pneumatic pressure drop judging means is inhibited when it is judged that traveling conditions vary because of different road conditions between left and right sides (claim 1).

According to this embodiments, when the vehicle is traveling on a road which varies in condition between left and right sides, a front/rear ratio of rotational angular velocities of the tires on one side changes more markedly than that of rotational angular velocities of the tires on the other side, and a large time differential value appears. Therefore, it is possible to judge the varying traveling road condition between left and right sides. When it is judged that the condition varies between left and right sides, there is a possibility that the tire rotation of four wheels may become an unbalanced state and give a false alarm. Then, a judgment by the pneumatic pressure drop judging means is inhibited to prevent an issuance of a false alarm, thereby making it possible to certainly detect the tire pressure drop.

The one-sided irregular road traveling judging means may judge the traveling condition which varies in road condition between left and right sides, based on a value obtained by integrating the difference in or the ratio of the time differential values of the front/rear wheel ratios between left and right sides, determined by the operating means (claim 2).

Even if the traveling condition which varies due to the road condition difference between left and right sides is temporarily judged, the influence of this judging is not exerted on the final determination because it is first subject to integral processing. Therefore, it is possible to get rid of an unstable condition attendant on the judgment of the pneumatic pressure drop.

The one-sided irregular road traveling judging means may judge the traveling condition which varies in road condition between left and right sides, when the value obtained by subjecting the difference in or the ratio of the time differential values of the front/rear wheel ratios between left and right sides determined by the operating means to the integral processing is greater than a predetermined threshold value $t_1$, and judges the traveling condition which is the same road condition between the left and right sides when the difference in or the ratio of the time differential values of the front/rear wheel ratios between left and right sides becomes smaller than a predetermined threshold value $t_2$ ($t_2 < t_1$) (claim 3).

It sometimes happens that the value subjected to the integral processing does not damp easily, even if the vehicle has already transferred from the traveling condition which varies in road condition between left and right sides to a normal traveling condition. Therefore, when the difference in or the ratio of the time differential values of the front/rear wheel ratios between left and right sides becomes smaller than the predetermined threshold value $t_2$ ($t_2 < t_1$) after comparing them, the road condition is judged to be the same between the left and right sides. And the value subjected to the integral processing is cleared forcibly. Thereby, it is possible to rapidly judge a tire pressure drop by the pneumatic pressure judging means after the vehicle moves from the traveling condition which varies in road condition between left and right sides to the normal traveling condition.

The one-sided irregular road traveling judging means may judge the traveling condition which varies in road condition between left and right sides, when the value of the difference in or the ratio of the time differential values of the front/rear wheel ratios between left and right sides determined by the operating means becomes greater than a predetermined threshold value $t_1$; and judges the traveling condition which is the same road condition between the left and right sides when the difference in or the ratio of the time differential values of the front/rear wheel ratios between left and right sides becomes smaller than a predetermined threshold value $t_2$ ($t_2 < t_1$).

In this case, the traveling condition which varies in road condition between left and right sides is judged when the value obtained by the difference in or the ratio of the time differential values of the front/rear wheel ratios between left and right sides is greater than a predetermined threshold value $t_1$; and the judged state can be maintained even if the vehicle has already transferred from the traveling condition which varies in road condition between left and right sides to a normal traveling condition. That is to say, the time constant of the integral can be regarded as infinite. However, the value of the difference in or the ratio of the time differential values of the front/rear wheel ratios between left and right sides is compared with a predetermined threshold value $t_2$ ($t_2 < t_1$). If smaller than the threshold value $t_2$, it is immediately judged that the vehicle is traveling on a road condition which is the same between the left and right sides. Consequently, it is possible to rapidly judge the tire pressure drop by the pneumatic pressure judging means after the vehicle in transferred from the irregular road traveling condition to a normal road traveling condition.

In addition, the tire pressure drop alarm device according to claim 5 merely differs from the invention according to claim 1 by time differentiating step, and have the same advantages as those of the invention according to claim 1.

In addition, the tire pressure drop alarm devices according to claims 6, 7 and 8 merely differ from the tire pressure drop alarm devices according to claims 2, 3 and 4 by a time differentiating step, and have the same advantages as those of the pressure drop alarm devices according to claims 2, 3 and 4.

The above objects as well as other objects of the present invention will become more apparent to those skilled in the art from the following description with reference to the accompanying drawings.

BRIEF DESCRIPTION OF THE DRAWINGS

FIG. 3 is a graph for explaining the judging method of the pneumatic pressure drop by means of D value.

DETAILED DESCRIPTION OF THE EMBODIMENTS

Construction of Tire Pressure Drop Alarm Device

Figure 1:
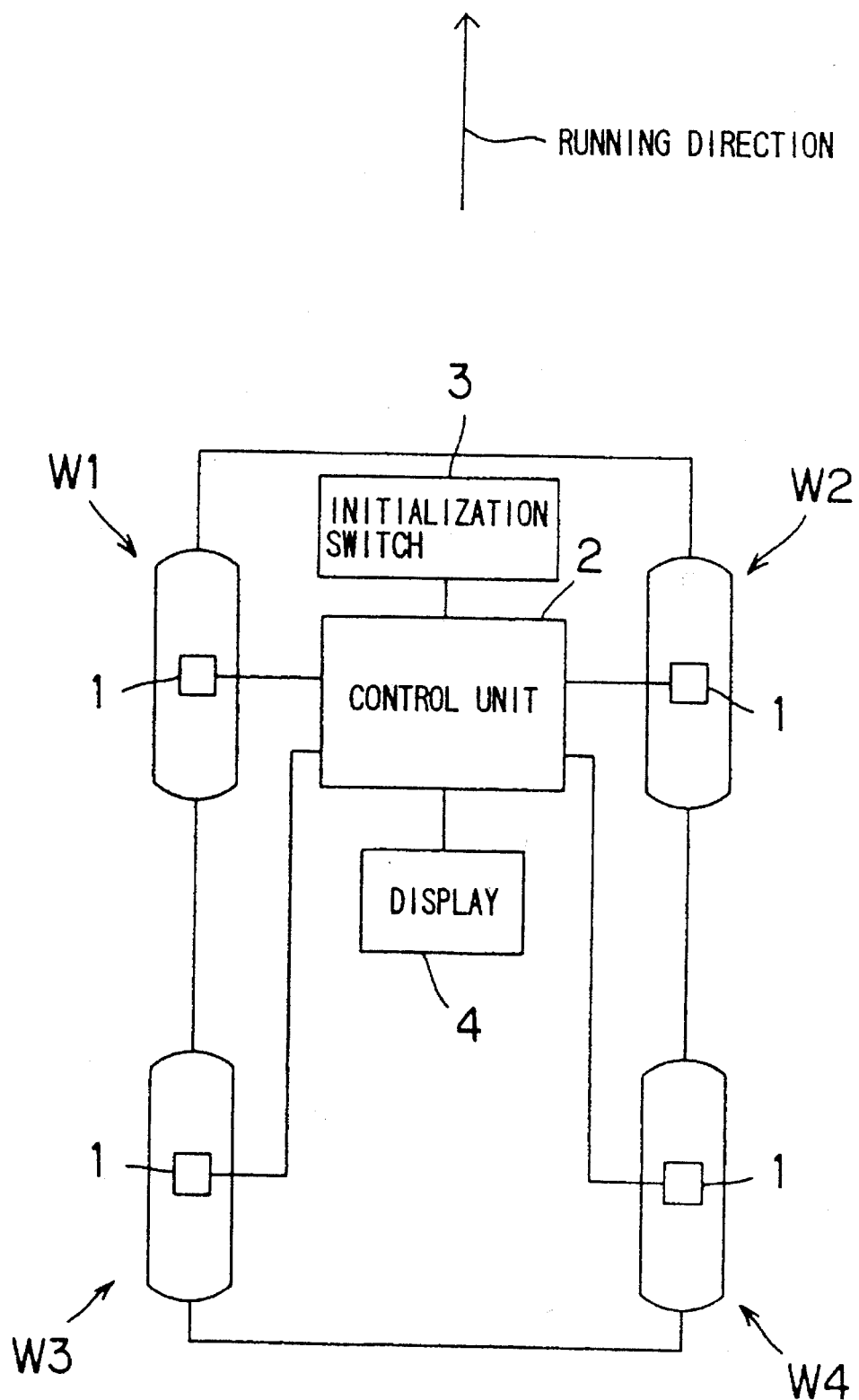
FIG. 1 is a block diagram showing the construction of a tire pressure drop alarm device.

FIG. 1 is a block diagram showing the construction of a tire pressure drop alarm device. This tire pressure drop alarm device is provided with a wheel speed sensor 1 having a construction which has hitherto been known, which is respectively associated with the tires $W_1$, $W_2$, $W_3$ and $W_4$ of a four-wheel vehicle. Output signals of each of the wheel speed sensors 1 are supplied to a control unit 2. An initialization switch 3 operated by a driver and a display 4 for indicating a tire having pneumatic pressure drops are connected to the control unit 2.

Figure 2:
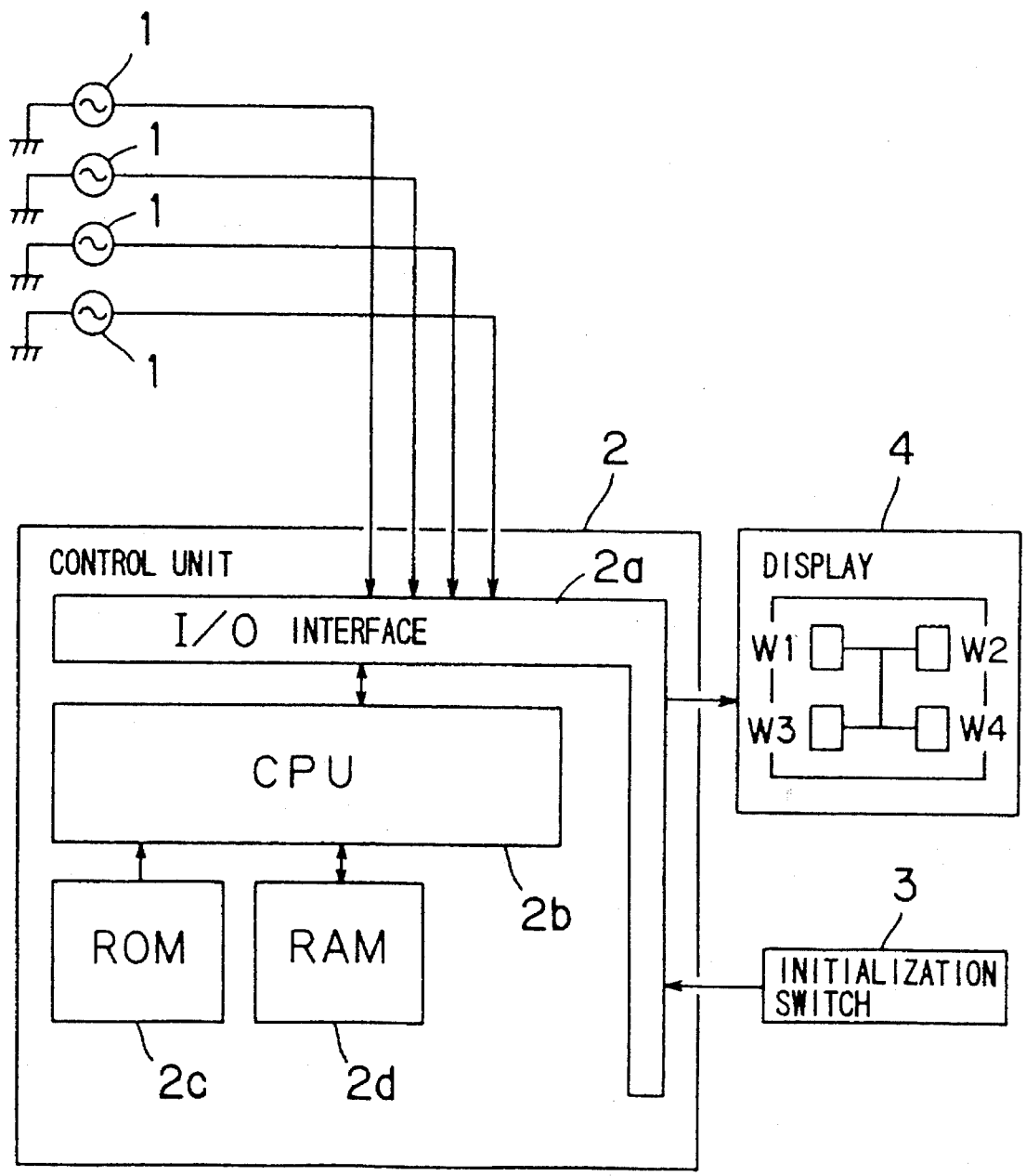
FIG. 2 is a block diagram showing the electrical construction of the tire pressure drop alarm device.

FIG. 2 is a block diagram showing the electrical construction of the tire pressure drop alarm device. The control unit 2 is composed of a micro computer and its hardware construction includes an I/O interface 2a required for sending and receiving signals to and from an external device, a CPU 2b serving as the center of operation processing, a ROM 2c in which a control operation program of the CPU 2b is stored and a RAM 2d in which data, etc. are temporarily written to or the written data are read out of it when the CPU 2b performs a control operation. The RAM 2d is provided with an area for storing a rotational angular velocity for memorizing a rotational angular velocity $F_i$ which is effective for initial correction processing, an area for storing speed values for memorizing a speed of the vehicle before one period and an area for storing a distance value for memorizing a traveling distance of the vehicle, as described hereinafter.

Specifically, each of the wheel speed sensors 1 is provided with a sensor rotor having a plurality of teeth 49 or 98) inside of the wheel of the tire $W_i$, and generates pulse signals corresponding to the number of teeth by rotating the sensor rotor (referred to as a "wheel speed pulse" hereinafter). The CPU 2b calculates rotational angular velocities $F_1$, $F_2$, $F_3$ and $F_4$ of each tire $W_i$ as well as front/rear wheel ratios $F_1/F_3$ and $F_2/F_4$ on the basis of the wheel speed pulses, every predetermined sampling period ΔT.

The CPU 2b detects a speed $V_i$ of the tire $W_i$ on the basis of the rotational angular velocity $F_i$. When the radiuses of all tires $W_1$, $W_2$, $W_3$ and $W_4$ are R, a speed $V_i$ is determined as follows:

$$V_i = R \times F_i \quad (2)$$

The CPU 2b further judges whether the vehicle is traveling linearly or not. Whether the vehicle is traveling linearly or not is judged based on whether both differences in or ratios of the rotational angular velocities $F_i$ of left and right front tires $W_1$ and $W_2$ as well as left and right rear tires $W_3$ and $W_4$ exceed a defined value in the same sign or not. When both do not exceed the defined value in the same sign, it is judged that the vehicle is traveling linearly.

Pneumatic Pressure Drop Detection Processing (1) Normal Processing

The pneumatic pressure drop detection processing of the tire $W_i$ is performed based on the following equation:

$$D = 2[(F_1+F_4)-(F_2+F_3)]/(F_1+F_2+F_3+F_4) \quad (3)$$

In this embodiment, it is judged that the pneumatic pressure has dropped when the D value calculated from the expression satisfies the following expression (4) (see FIG. 3):

$$D < D_{TH1} \text{ or } D > D_{TH2} \quad (4)$$

where $D_{TH1}$ and $D_{TH2}$ indicate a predetermined constant, respectively.

In this embodiment, a method is provided for generating an alarm informing a driver not only that a tire has a pneumatic pressure drop, but also which tire has the drop in pneumatic pressure. According to the method, it is first determined that:

the tire having a pneumatic pressure drop is $W_1$ or $W_4$ if D <0 in the equation (3); and the tire having a pneumatic pressure drop is $W_2$ or $W_3$ if D <0.

Furthermore, if the vehicle is traveling linearly, it is determined that:

the tire having a pneumatic pressure drop is $W_1$ if $F_1 > F_2$;

the tire having a pneumatic pressure drop is $W_2$ if $F_1 < F_2$;

the tire having a pneumatic pressure drop is $W_3$ if $F_3 > F_4$; and the tire having a pneumatic pressure drop is $W_4$ if $F_3 < F_4$.

In such way, after the tire $W_i$ having a pneumatic pressure drop has been specified, the results are provided to an indicator 4, shown in FIG. 2 as a display. As an example embodiment of the indicator 4, for example, an indicating lamp corresponding to the tire having a pneumatic pressure drops among the four tires $W_1$ to $W_4$, is turned on. When the tire cannot be specified, four indicating lamps are simultaneously turned on. Therefore, it is possible to recognize which tire has a drop in pneumatic pressure at a glance.

(2) Processing Taking Traveling on One-sided Irregular Road Into Consideration

Next, processing taking traveling on the one-sided irregular road into consideration will be explained.

In the above-described pneumatic pressure drop detection processing, when the vehicle is traveling on the road wherein only one side is slippery, the D value sometimes exceeds the threshold value, thereby giving an alarm, even if the tire has a normal internal pressure.

Figure 4:
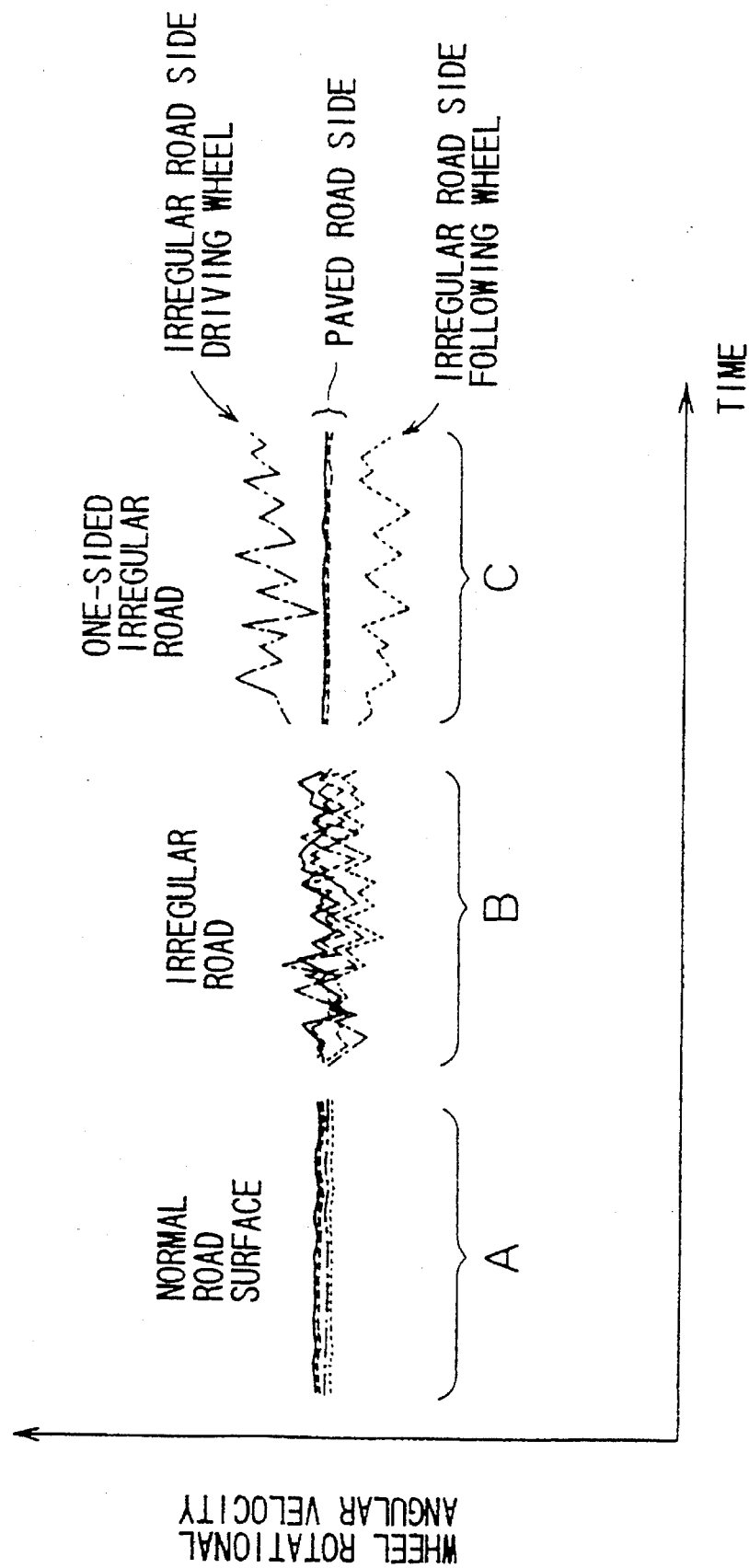
FIG. 4 is a graph showing the change in a wheel speed of the respective wheels in case of traveling on the paved road (A), traveling on a road having irregular driving surfaces on both sides ("both-sided irregular road") (B), and traveling on the one-sided irregular road (C).

Examining the change in a wheel speed of the respective wheels, using actual data, the results are as shown in FIG. 4. FIG. 4 shows a graph in which measured rotational angular velocities of every wheel are plotted when the vehicle travels on a paved road A, a both-sided irregular road B (e.g. a gravel road), and an one-sided irregular road C (e.g. tires traveling on a shoulder on one side).

Referring to FIG. 4, the rotational angular velocities $F_i$ of four wheels are almost the same when traveling on the paved road A. The rotational angular velocities $F_i$ of four wheels are almost the same on average, and change markedly when traveling on the both-sided irregular road B. This velocity change on the both-sided irregular road is considered due to unevenness of the road and due to slipperiness of the road. However, when traveling on the one-sided irregular road C, the rotational angular velocities $F_i$ of the paved road-side tires are nearly constant, and the rotational angular velocities $F_i$ of the driving wheel on the irregular road-side changes markedly in the plus side of the angular velocity on the paved road, and the rotational angular velocity of the non-driving or following wheel on the irregular road-side changes markedly in the minus side of the angular velocity on the paved road. The reason the angular velocity of the driving and following wheel on the irregular road greatly shift to plus and minus sides of the angular velocity of the wheel on the paved road is because the irregular road is slippery with sand or grass and the driving wheel tends towards spinning and the following wheel tends towards braking. The reason why the angular velocity of the driving and following wheel on the irregular road markedly changes is due to the change of unevenness and slipperiness of the road.

Figure 5:
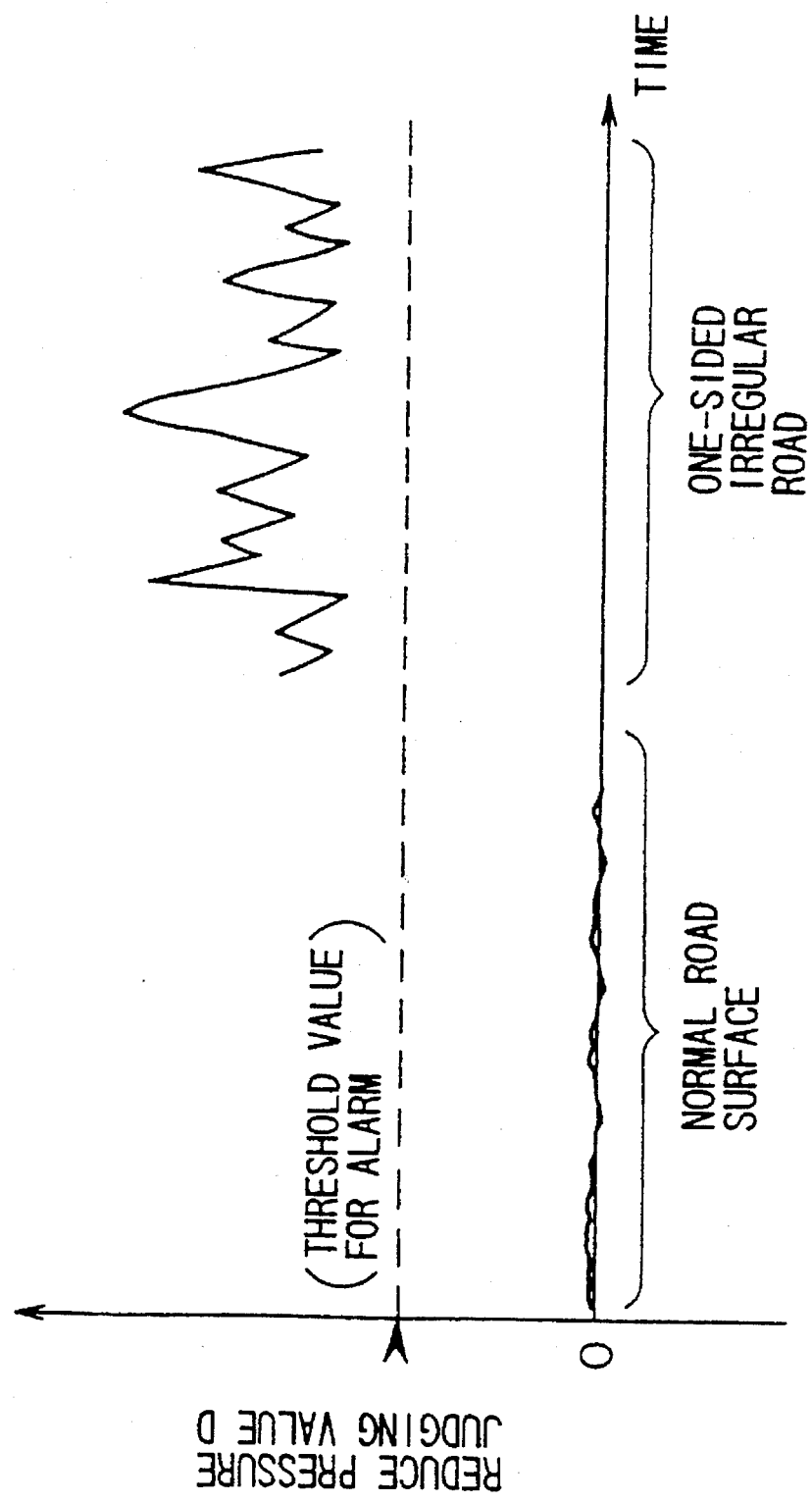
FIG. 5 is a graph showing the situation where the D value becomes an abnormal large value on the one-sided irregular road in order to exceed the threshold value for alarm.

When the D value is calculated based on such data, it becomes an abnormal large value for the slippery one-sided irregular road as shown in FIG. 5 to exceed the threshold value for alarm, though D normally should be nearly equal to 0 for normal internal pressure.

In order to prevent a false alarm, it is necessary to detect the situation of the one-sided irregular road to inhibit the judgment of the D value at this point (above equations (3) and (4)). This is because the rotational angular velocity $F_i$ of the slipping tire does not reflect the internal tire pressure.

Figure 6:
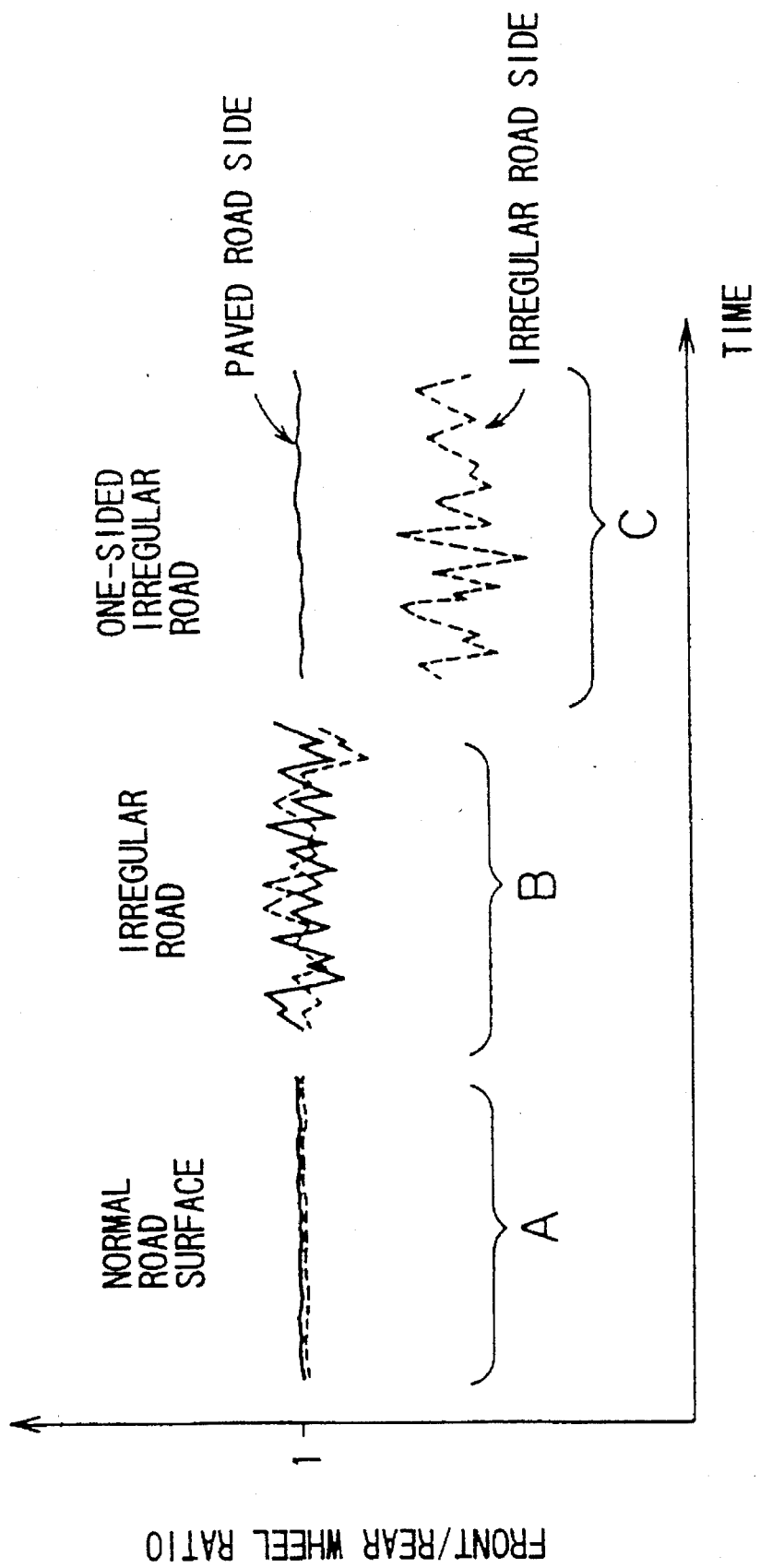
FIG. 6 is a graph showing the change in front/rear ratio of rotational angular velocities of the respective wheels in case of traveling on the paved road (A), traveling on the both-sided irregular road (B) and traveling on the one-sided irregular road (C).

In addition, when the front/rear wheel ratio of the rotational angular velocity during traveling on the paved road A, the both-sided irregular road B (e.g. a gravel road) and the one-sided irregular road C (e.g. one-side tires traveling on a shoulder) are detected, the results are as shown in FIG. 6. The front/rear wheel ratios of left and right sides are almost the same on the paved road A. The front/rear wheel ratios of left and right sides are remarkably changing on the both side irregular road B. However, when the vehicle is traveling on the one-sided irregular road C, the front/rear wheel ratio on the irregular side is rapidly changing. In such a condition that the vehicle is traveling on the one side-irregular road, it is not possible to precisely detect a tire pressure drop because of the slip of wheel on the irregular side. But one can detect an one-side irregular road condition by the use of a phenomenon of rapid changing of the front/rear wheel ratios on the irregular road side as explained above. Accordingly, it becomes possible to prevent a false alarm by prohibiting the tire pressure drop detection process when it is detected that the vehicle is traveling on a one-side irregular road.

Figure 7:
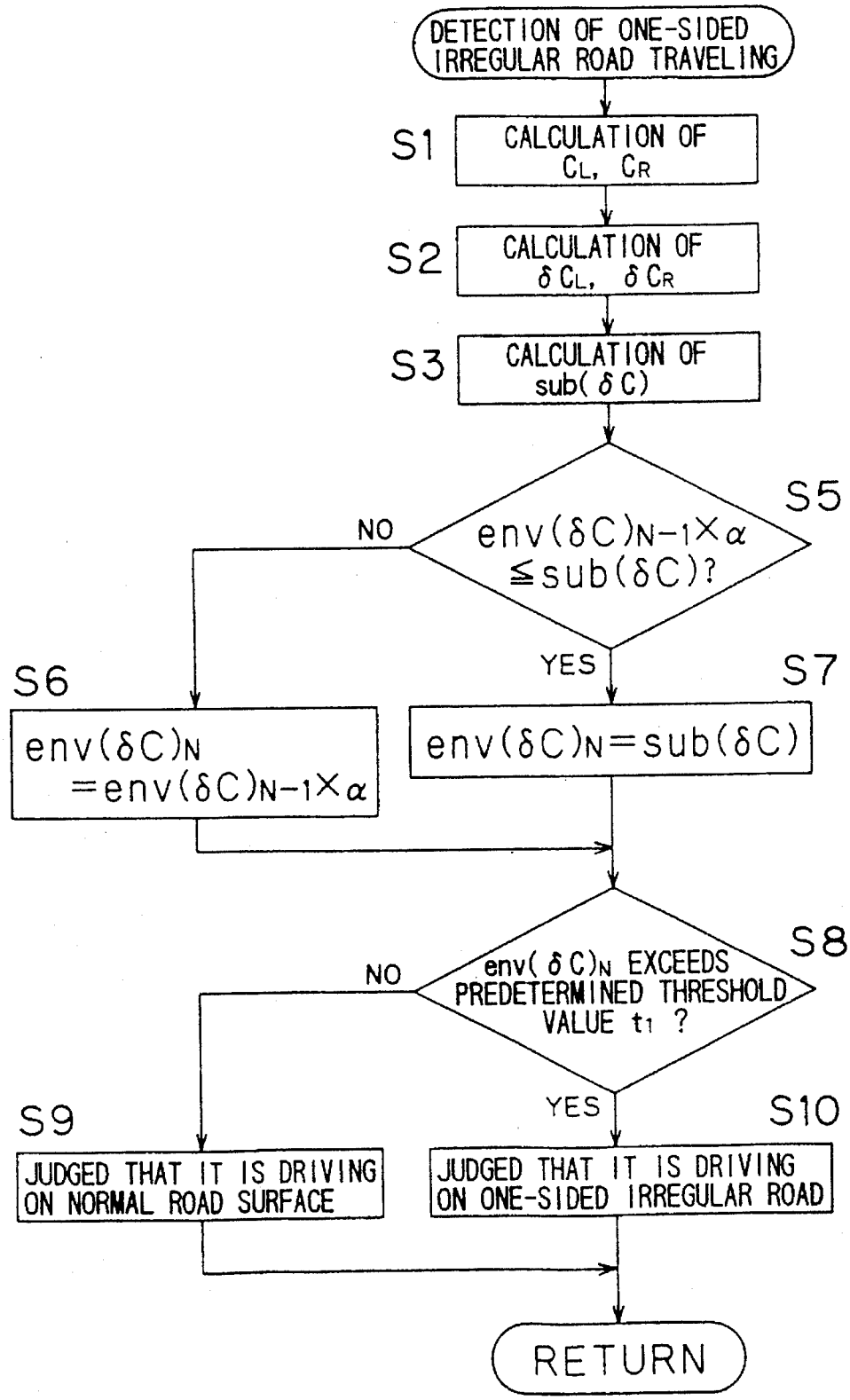
FIG. 7 is a flow chart showing a pneumatic pressure drop detection processing.

Hereinafter, the pneumatic pressure drop detection processing to be performed in this embodiment will be explained with reference to the flow chart (FIG. 7).

Firstly, the front/rear wheel ratio $F_1/F_3$ and the front/rear wheel ratio $F_2/F_4$ are represented by $C_L$ and $C_R$, respectively.

The CPU $2b$ calculates front/rear wheel ratios $C_L=F_1/F_3$ and $C_R=F_2/F_4$ of the rotational angular velocities of the respective tires $W_1$, $W_2$, $W_3$ and $W_4$ every predetermined sampling period $\Delta T$ (e.g. one second) (step S1) to determine differences $C_L-C_{L'}$ and $C_R-C_{R'}$ between $C_L$ and $C_R$ and front/rear wheel ratios $C_{L'}$ and $C_{R'}$ which were calculated last time, i.e. one period previous (step S2). Such differences are referred to as a "differential front/rear wheel ratio" $\delta C_L$ and $\delta C_R$, respectively. That is, $$\delta C_L = C_L - C_{L'} \quad (5)$$

$$\delta C_R = C_R - C_{R'} \quad (6).$$

The reason why the differential front/rear wheel ratios are determined is to know the remarkableness of the change in front/rear wheel ratio.

Figure 8:
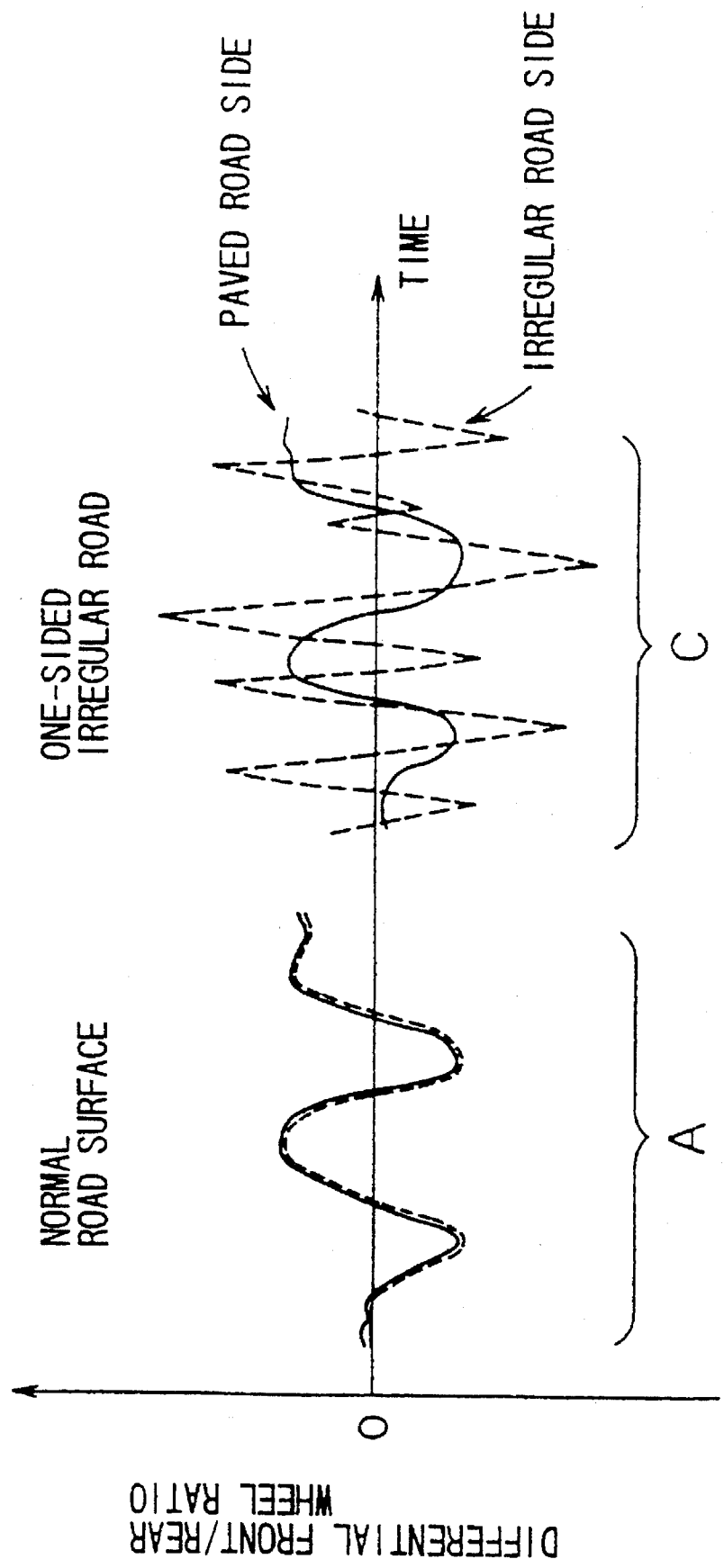
FIG. 8 is a graph showing the change in differential front/rear wheel ratio with time in case of traveling on the paved road (A) and traveling on the one-sided irregular road (c).

FIG. 8 is a graph showing the change in a differential front/rear wheel ratio with time. When it is traveling on the paved road (A), the differential front/rear ratios of left and right sides are smoothly changing similarly. When it is traveling on the one-sided irregular road (C), the differential front/rear wheel ratio at the paved road side is changing smoothly, while the differential front/rear wheel ratio at the irregular road side is changing up and down markedly.

The CPU $2b$ determines the difference between $\delta C_L$ and $\delta C_R$, i.e., the difference in differential front/rear wheel ratios between left and right sides to take an absolute value (step S3).

$$\text{sub}(\delta C) = |\delta C_L - \delta C_R| \quad (7)$$

The reason why the difference between left and right sides is determined is to remove the influence of the change in a front/rear wheel ratio at the time of accelerating/decelerating.

The CPU $2b$ plots the absolute value sub($\delta C$) of the difference in the differential front/rear wheel ratios of left and right sides to determine an envelope of the change with time.

Figure 9:
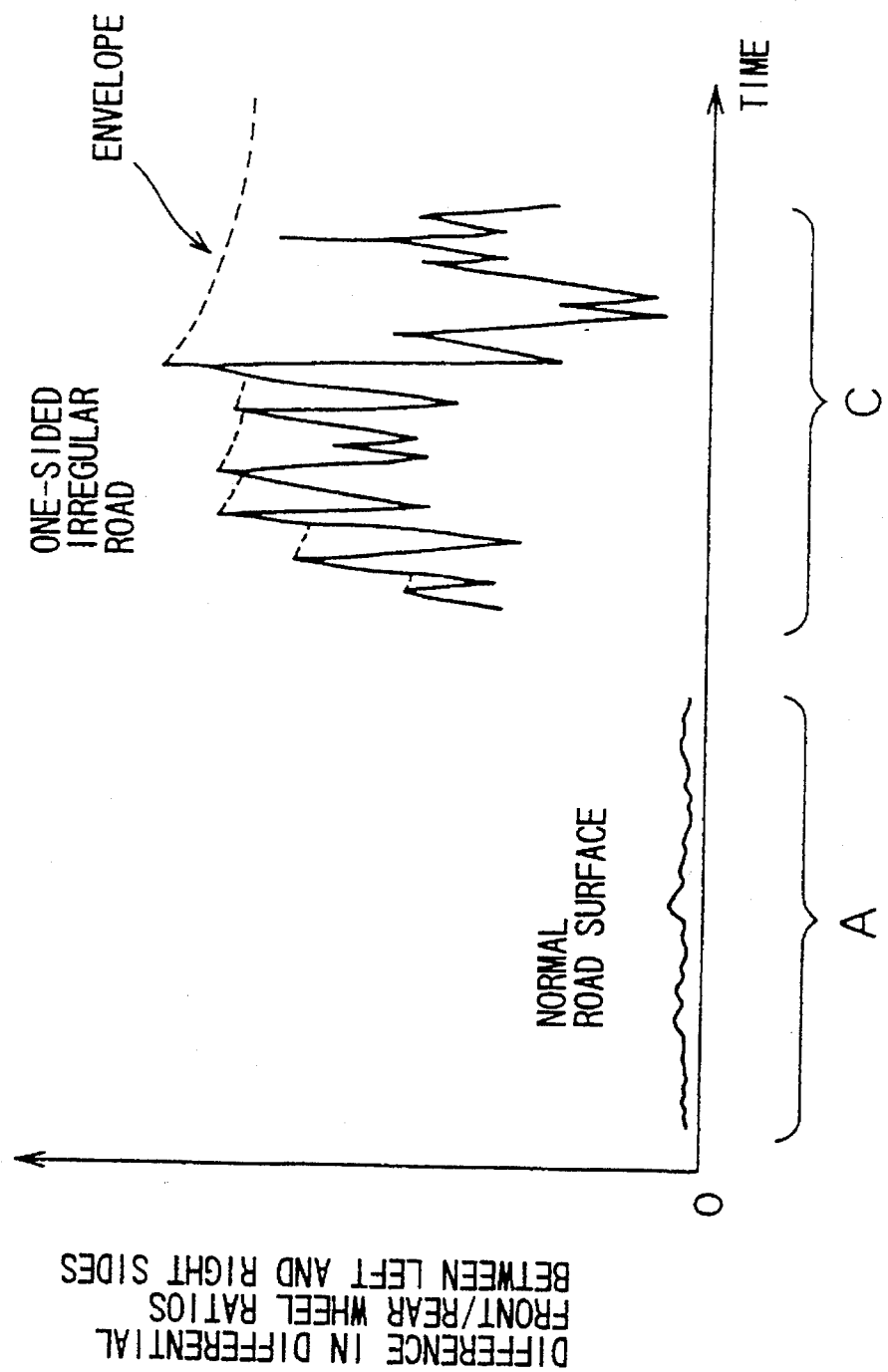
FIG. 9 is a graph showing the absolute value of the change in differential front/rear wheel ratio between left and right sides with time in case of traveling on the paved road (A) and traveling on the one-sided irregular road (C).

FIG. 9 is a graph showing the change in the absolute value sub($\delta C$) of the difference in the differential front/rear wheel ratios with time. When the vehicle is traveling on the paved road (A), the differential front/rear wheel ratios compensate each other between left and right sides; therefore, sub($\delta C$) is approximately equal to 0. When it is traveling on the one-sided irregular road (C), the differential front/rear wheel ratios are changing markedly, since they cannot compensate each other between left and right sides. Accordingly, the envelope appears significantly.

The value of the above envelope is represented by env($\delta C$).

The env($\delta C$) is determined as follows. The env($\delta C$) of the last time is compared with the sub($\delta C$) of this time (step S5), and env($\delta C$)=sub($\delta C$), if sub($\delta C$)≧env($\delta C$)×α (step S7); env($\delta C$)=env($\delta C$)×α, if sub($\delta C$)<env($\delta C$)×α (step S6). In the above equations, α is a damping constant, and it becomes, for example, a value of about 0.99.

In such a way, the value of the envelope (output value of an integral circuit having a fixed time constant) env($\delta C$) can be determined.

The env($\delta C$) of this envelope is taken as the one-sided irregular road traveling judging value.

The reason why the value of the envelope is adopted is as follows. When the idling of the wheel on the one-sided irregular road continues for a long period, the sub($\delta C$) sometimes becomes small because it is a differential value although the difference in front/rear wheel ratios between left and right sides is large. Therefore, judging only by the difference sub($\delta$C) in differential front/rear wheel ratios between left and right sides, it is likely to judge wrongly that it is traveling normally.

The CPU 2b compares the one-sided irregular road traveling judging value env($\delta$C) with the fixed threshold value $t_1$ (step S8) and judges that the vehicle is traveling on the one-sided irregular road (step S10) to stop the tire pressure drop detection processing when the one-sided irregular road traveling judging value env($\delta$C) exceeds the fixed threshold value $t_1$. When the one-sided irregular road traveling judging value env($\delta$C) does not exceed the fixed threshold value $t_1$, it is judged that the vehicle is traveling on the normal road surface (step S9) to perform the tire pressure drop detection processing.

Further, since the damping constant $\alpha$ is nearly equal to 1, the one-sided irregular road traveling judging value env($\delta$C) does not damp easily; the situation where it exceeds the threshold value $t_1$ sometimes continues for several minutes, even if the normal traveling has set in after the one-sided irregular road traveling has finished. The tire pressure drop detection cannot be performed during that period; however, in view of the object of the tire pressure drop detection, it may be considered to be a shortcoming, even if the detection cannot be performed for a short period of time.

However, it is possible to provide an wherein the tire pressure drop can be detected immediately when normal traveling has resumed after the one-sided irregular traveling was finished. According to this embodiment, the difference sub($\delta$C) in differential front/rear wheel ratios between left and right sides is always checked. Even if the one-sided irregular road traveling judging value env($\delta$C) does not damp easily, it is judged to be traveling on the normal road surface to perform the tire pressure drop detection processing, if the situation where the sub($\delta$C) is small continues.

Figure 10:
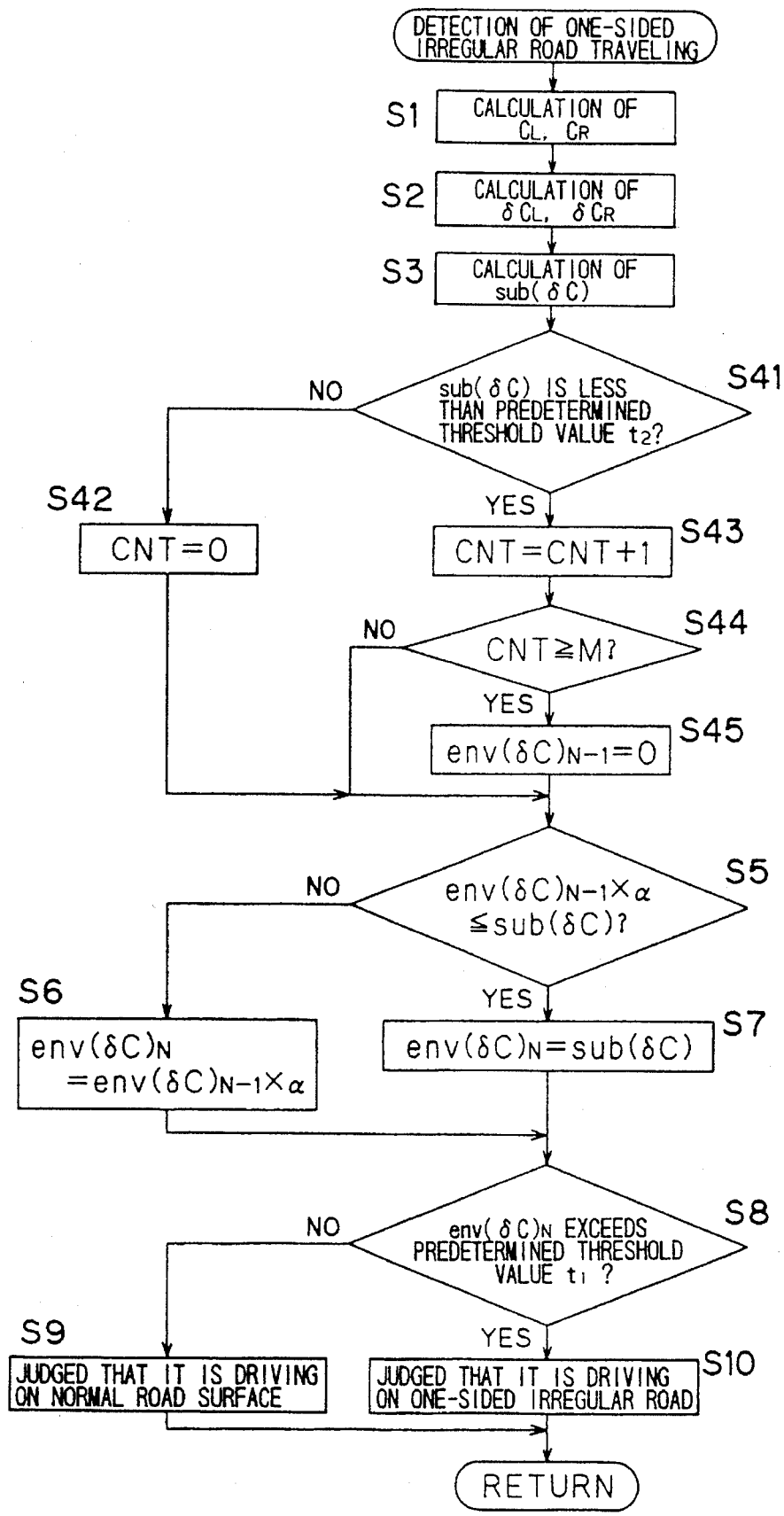
FIG. 10 is a flow chart showing a pneumatic pressure drop detection processing.

FIG. 10 is a flow chart showing pneumatic pressure drop detection processing based on this embodiment.

Explaining with this current, calculation of the front/rear wheel ratios $C_L$ and $C_R$, calculation of the differential front/rear wheel ratios $\delta C_L$, $\delta C_R$ and calculation of the absolute value sub($\delta$C) of the difference in differential front/rear wheel ratios between left and right sides are the same as those of the flow chart of FIG. 7.

Next, the normal surface road judgment based on the sub($\delta$C) is performed (steps S41 to S45).

In the step S41, it is judged whether the sub($\delta$C) is less than the predetermined threshold value $t_2$ or not. When sub($\delta$C) is greater than the predetermined threshold valve $t_2$, the count value CNT is cleared to 0 (step S42) and the process proceeds to step S5. When the sub($\delta$C) is less than the predetermined threshold value $t_2$, the count value CNT is moved up by 1 (step S43) to judge whether the count value CNT is larger than a predetermined number M or not (step S44). When the count value CNT becomes larger than the predetermined number M, the one-sided irregular road judging value env($\delta$C) is 0 (step S45). When the sub($\delta$C) is more than the predetermined threshold $t_2$, the count value CNT is cleared to be 0 to go to the step S5.

The predetermined threshold value $t_2$ is a threshold value for judging that the vehicle is traveling on the normal road surface when the situation where the sub($\delta$C) is small continues to perform the tire pressure drop detection processing even if the one-sided irregular road traveling judging value env($\delta$C) does not damp easily, and is a value smaller than the threshold value $t_1$ of the one-sided irregular road traveling judging value env($\delta$C). The predetermined number M is a number used in the situation where the sub($\delta$C) continues to be smaller than the threshold value $t_2$, which is required for judging that the vehicle is traveling on the normal road surface. Accordingly, even if the sub($\delta$C) happens to become smaller than the threshold value $t_2$ due to the influence of noise, etc, the env($\delta$C) will not become 0 due only to that.

In addition, even if the vehicle is traveling on the normal road surface, the sub($\delta$C) sometimes exceed the threshold value $t_1$ temporarily due to the partial irregularity of the road surface. Also in this case, the env($\delta$C) does not damp easily, and therefore, the tire pressure drop detection processing is sometimes prevented. This case has also an advantages that the vehicle is judged to be traveling on the normal road surface to perform the tire pressure drop detection processing, if the situation where the sub($\delta$C) is small continues, as described above.

In the steps S5, S6 and S7, the processing for determining the value of the envelope env($\delta$C) is performed, similar to the flow chart of FIG. 7. In the steps S8, S9 and S10, the vehicle is judged to be traveling on the one-sided irregular road or normal road surface by comparing the value of the envelope env($\delta$C) with the threshold value $t_1$.

The above processing according to the flow chart of FIG. 7 will be explained using the graph (FIG. 11) showing the change in the env($\delta$C) and the sub($\delta$C) with time, and the processing according to the flow chart of FIG. 10 will be explained while making a comparison with the above, using the graph (FIG. 12) showing the change in the env($\delta$C) and the sub($\delta$C) with time.

Figure 11:
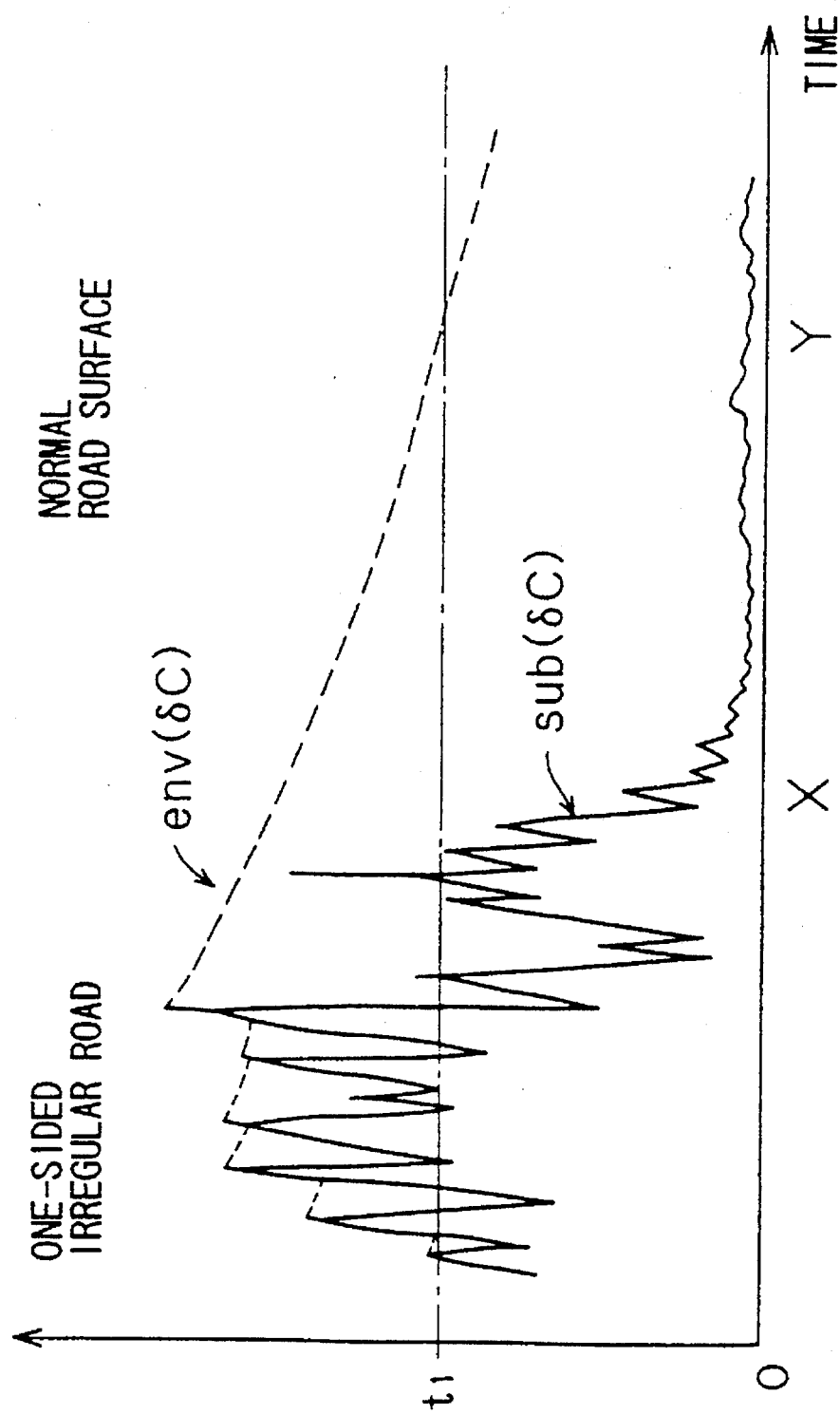
FIG. 11 is a graph showing the change in env(δC) and sub(δC) with time.

Referring to FIG. 11, env($\delta$C) does not damp easily with time even if the sub($\delta$C) is lowered at the time X. Therefore, the time Y where the env($\delta$C) becomes lower than the threshold value $t_1$ becomes far later than the time X.

Figure 12:
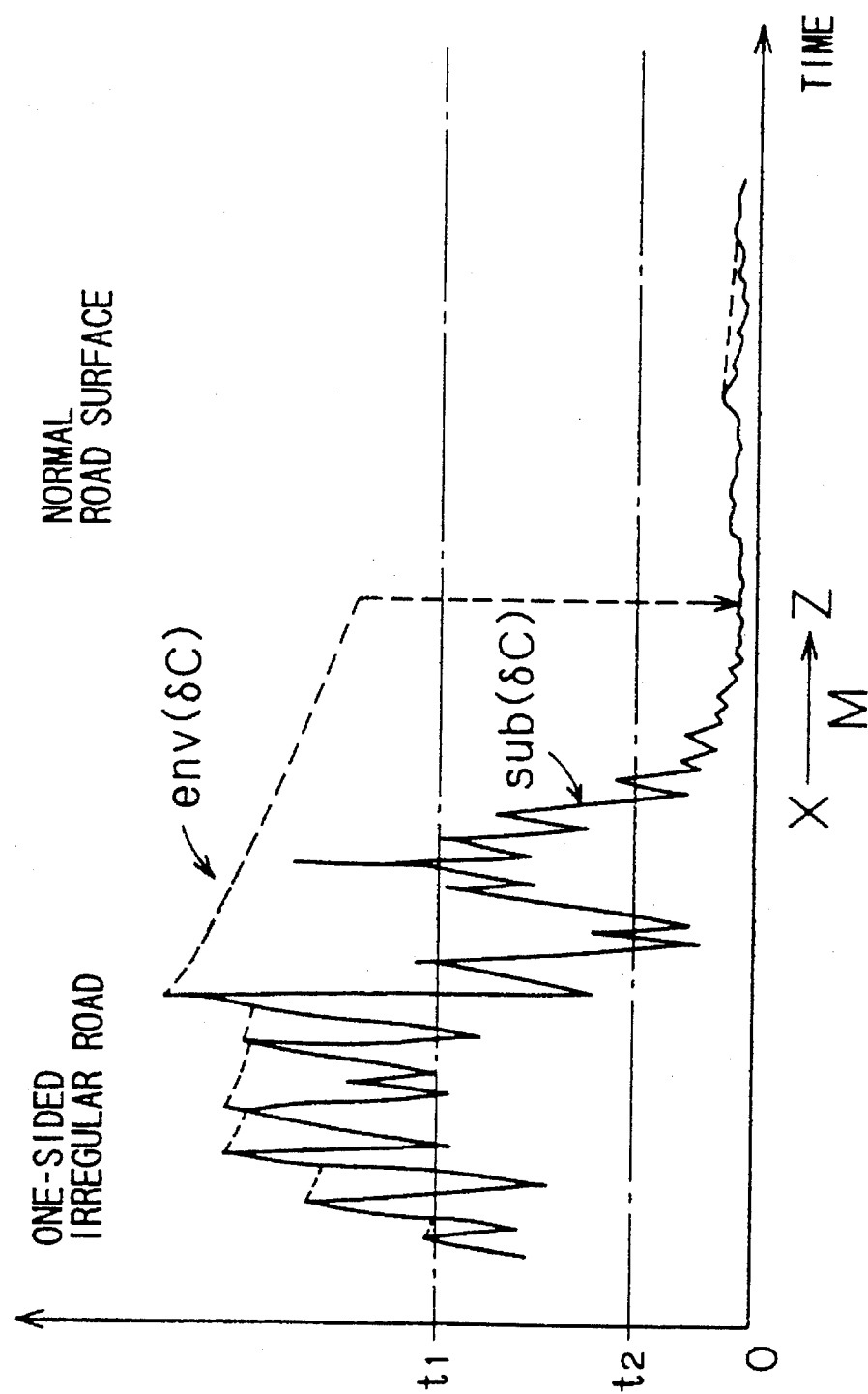
FIG. 12 is a graph showing the change in env(δC) and sub(δC) with time.

Referring to FIG. 12, the processing for comparing the sub($\delta$C) with the predetermined threshold value $t_2$ is added, and therefore, the sub($\delta$C) is lowered at the time X. In addition, when the situation where the sub($\delta$C) is smaller than the threshold value $t_2$ continues M times, the env($\delta$C) is forced into 0. Accordingly, when the vehicle transfers from the one-sided irregular road traveling to the normal road surface traveling, it is possible to follow this easily.

In the above embodiment, the damping constant $\alpha$ was assumed to be less than 1 ($\alpha<1$). However, the invention can employ the case when $\alpha=1$. $\alpha$ is preferably close to 1 or equal to 1, for the sake of rejecting one-side irregular road data. When $\alpha=1$, if sub($\delta$C) is once over the threshold value $t_1$, env($\delta$C) does not reduce, and the tire pressure drop detection is impossible forever. To avoid such a defect, as shown in the flow chart of FIG. 13, if sub($\delta$C) is below the predetermined threshold $t_2$, for M times, it is judged that the vehicle is traveling on a normal road (step S46). Accordingly, if the vehicle travels from an one-side irregular road to a normal road, the process follows such condition immediately. If sub($\delta$C) is over the threshold $t_2$, and is over the threshold $t_1$, it is judged that the vehicle is traveling on an one-side irregular road (step S48). If sub($\delta$C) is over the threshold $t_2$ and is below the threshold $t_1$, judgment is held reserved. The advantage of this embodiment is that the algorithm becomes simple and that memory can be saved since env($\delta$C) is not necessarily calculated.

Figure 13:
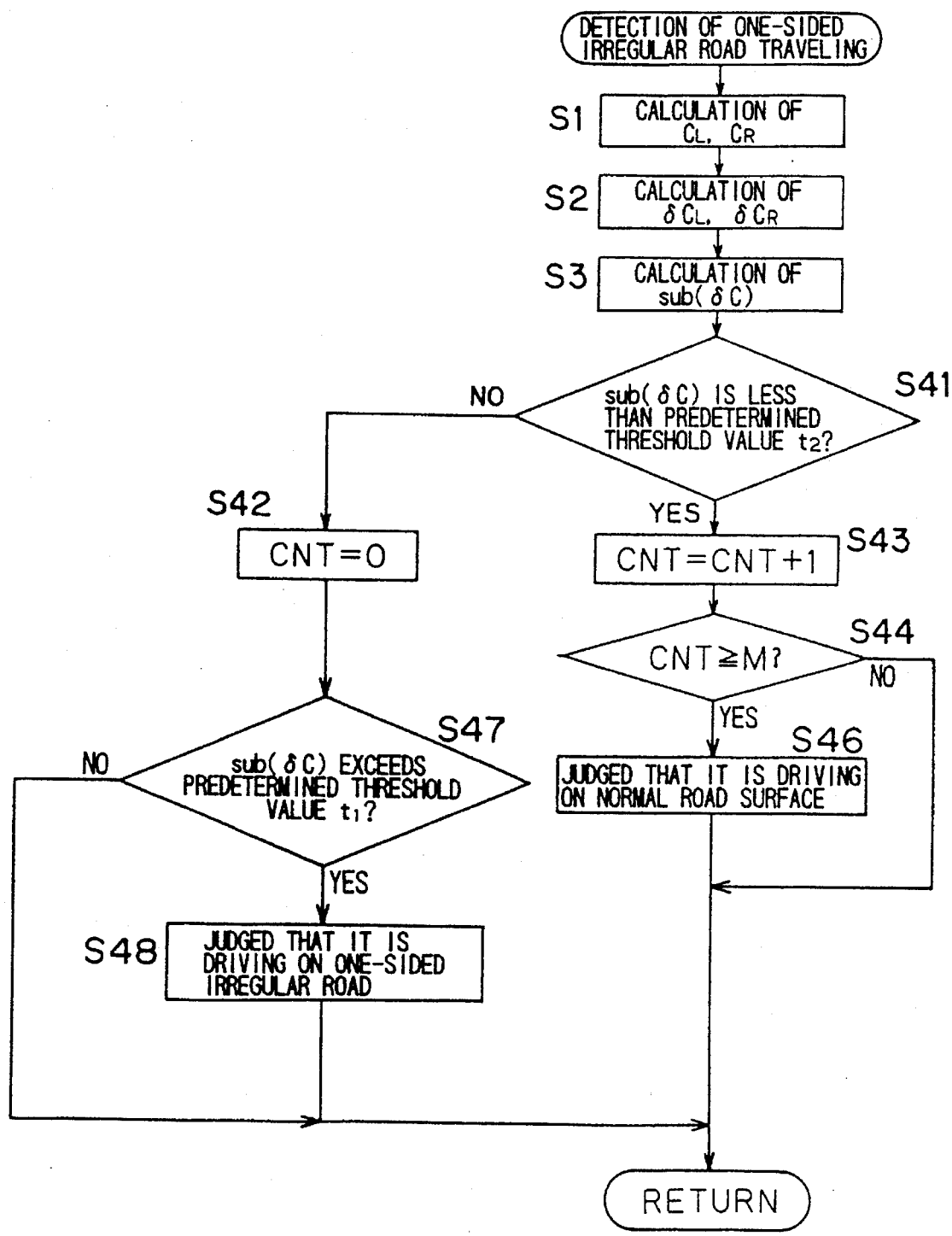
FIG. 13 is a flow chart showing a pneumatic pressure drop detection processing of another embodiment.
Figure 14:
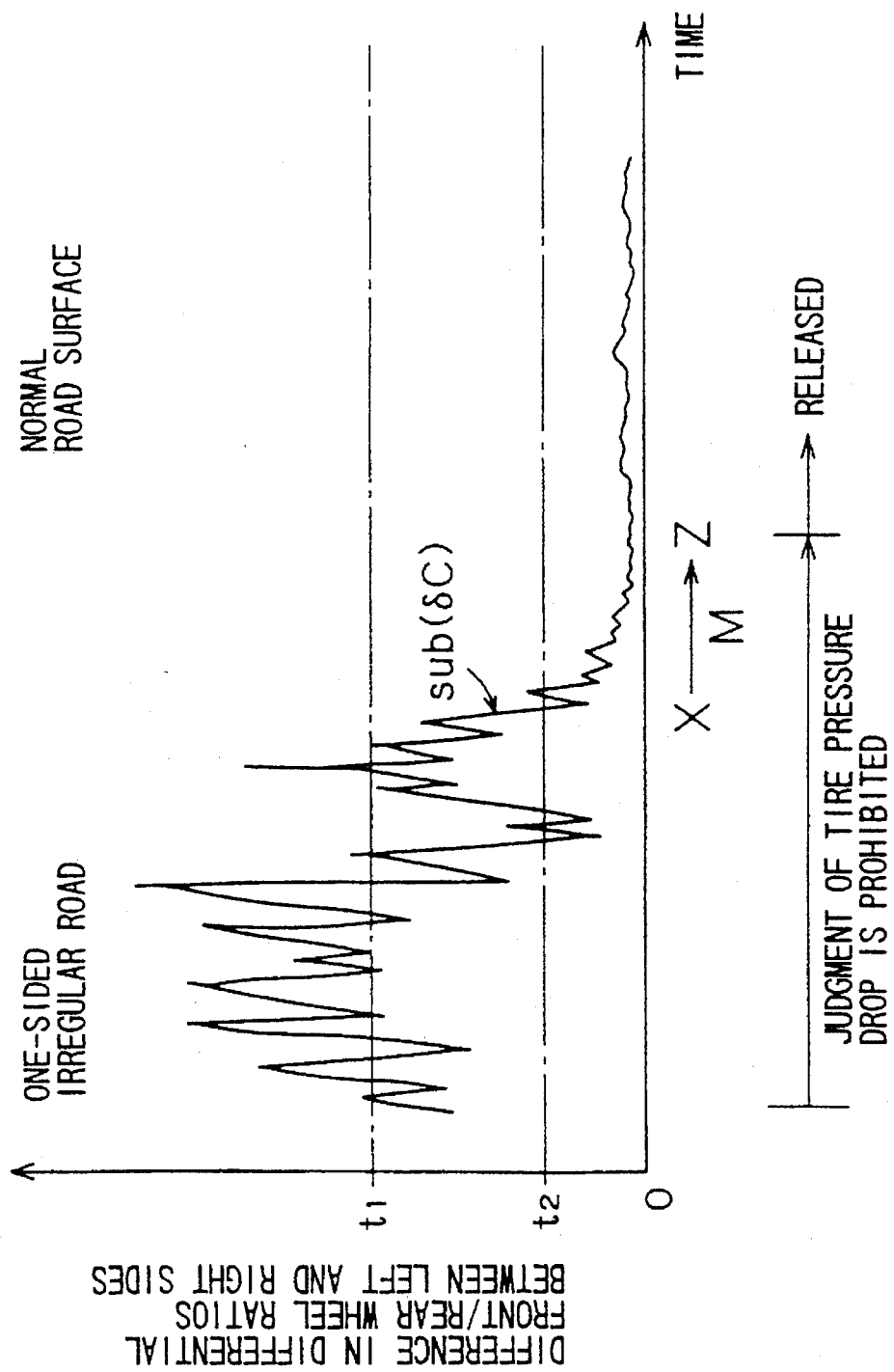
FIG. 14 is a graph showing the change in sub(δC) with time.
Figure 15:
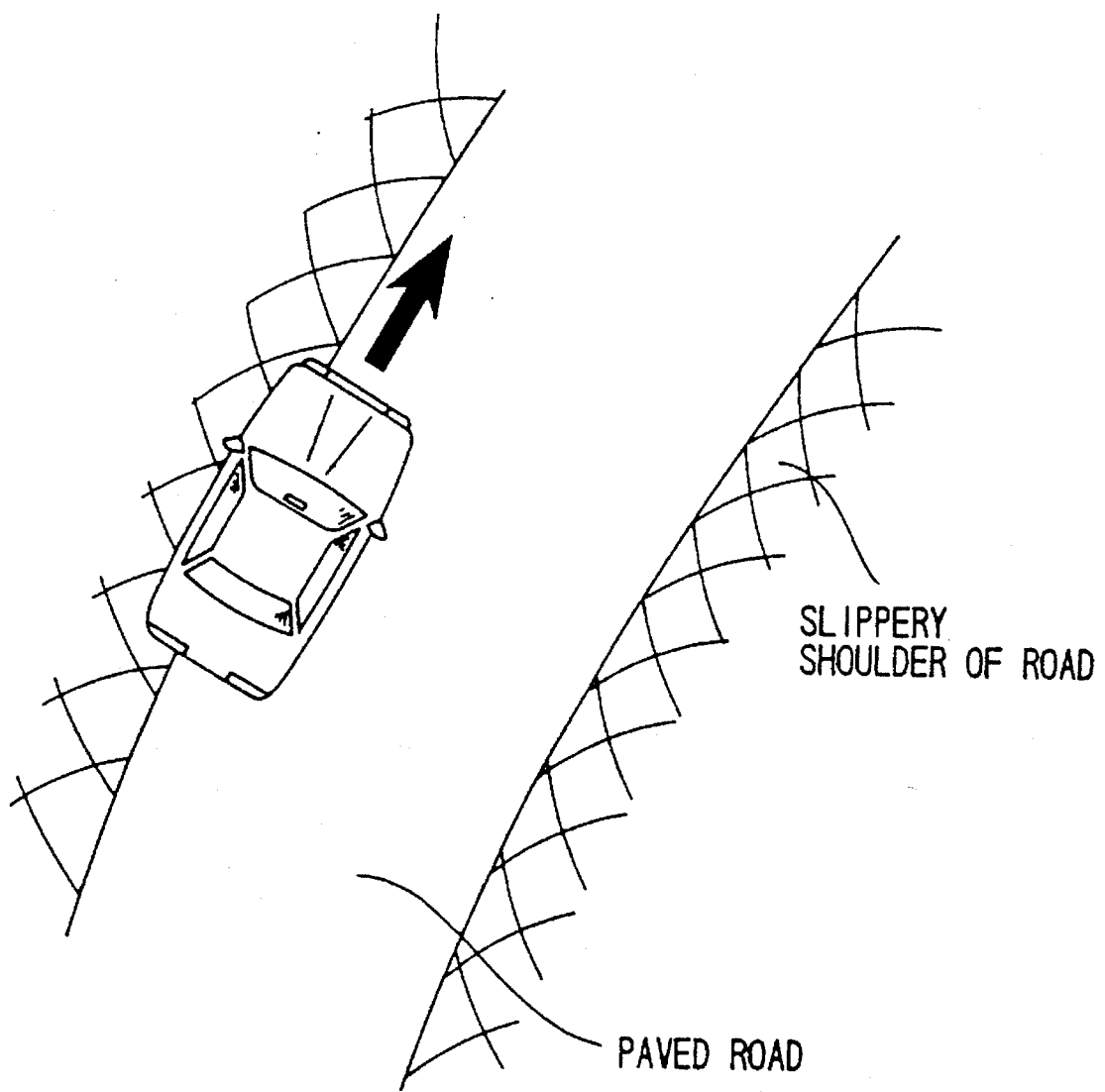
FIG. 15 is an illustration showing the situation where the vehicle is traveling while one side thereof is running into an irregular road (e.g. a shoulder of a non-paved road such as grassy or sandy place, or a road side covered with snow) because a vehicle is approaching in the opposite lane.

FIG. 14 is a graph showing a process of the above flow chart (FIG. 13). With this graph, sub($\delta$C) is reduced at the time X, and if sub($\delta$C) is below the threshold $t_2$ for M times, the processor judges the vehicle is traveling on normal road and tire pressure drop detection is released from the prohibited state to an enable state. So, the processor can rapidly follow from an one-sided irregular road traveling condition to a normal road traveling condition.

Finally, various modifications will be described.

In the form of the above embodiment, the CPU 2b determined the difference in differential front/rear wheel ratios between left and right sides, but the ratio of these may be determined.

In the form of the above embodiment, the difference between $\delta C_L$ and $\delta C_R$, i.e., the difference in differential front/rear wheel ratios between left and right sides is determined after the differential front/rear wheel ratios $\delta C_L$ and $\delta C_R$ were determined. To the contrary, the difference between last period and this period may be determined after the difference in front/rear wheel ratios between left and right sides was determined.

In the above embodiment, the value of the envelope is adopted as the one-sided irregular road traveling judging value. Otherwise, a transfer average value for some periods may be determined to take as a one-sided irregular road traveling judging value. In addition, the number of times that the sub($\delta C$) exceeds the threshold value in a predetermined time may be counted to take its counted value as the one-sided irregular road traveling judging value.

We claim:

1. A tire pressure drop alarm device, comprising:

rotational angular velocity calculating means for calculating rotational angular velocities of tires provided for corresponding wheels of a four-wheel vehicle having a front left wheel, a front right wheel, a rear left wheel and a rear right wheel;

pneumatic pressure drop judging means for judging whether a tire pressure drops, based on the rotational angular velocities calculated by the rotational angular velocity calculating means;

alarm means for generating a signal corresponding to a judgment result output of the pneumatic pressure drop judging means;

operating means for determining a first time differential value of a front/rear wheel ratio of the rotational angular velocities of the left tires and a second time differential value of a front/rear wheel ratio of the rotational angular velocities of the right tires, and determining a difference between the first time differential value and the second time differential value;

one-sided irregular road traveling judging means for judging a traveling condition of the vehicle, to determine a variation in road conditions between left and right sides of the vehicle, based on the difference between the first time differential value and the second time differential value determined by the operating means when the vehicle is operating under one-sided irregular road traveling conditions, and for generating a judgment result output; and means for inhibiting the pneumatic pressure drop judging means when the one-sided irregular road traveling judging means indicates a variation in road conditions between left and right sides of the vehicle.

2. A tire pressure drop alarm device according to claim 1, wherein the one-sided irregular road traveling judging means comprises means for performing integral processing on the difference between the first time differential value and the second time differential value determined by the operating means to generate a value upon which the traveling condition of the vehicle is judged.

3. A tire pressure drop alarm device according to claim 2, wherein the one-sided irregular road traveling judging means determines a variation in road conditions exists between the left and right sides of the vehicle, when the value generated by the integral processing means is greater than a predetermined threshold value $t_1$; and determines a variation in road conditions does not exist between the left and right sides of the vehicle when the value generated by the integral processing means becomes smaller than a predetermined threshold value $t_2$, wherein $t_1$ is greater than $t_2$.

4. A tire pressure drop alarm device according to claim 1, wherein the one-sided irregular road traveling judging means determines a variation in road conditions exists between the left and right sides of the vehicle, when the difference between the first time differential value and the second time differential value determined by the operating means is greater than a predetermined threshold $t_1$; and determines a variation in road conditions does not exist between the left and right sides of the vehicle when the difference between the first time differential value and the second time differential value becomes smaller than a predetermined threshold value $t_2$, wherein $t_1$ is greater than $t_2$.

5. A tire pressure drop alarm device, comprising:

rotational angular velocity calculating means for calculating rotational angular velocities of tires provided for corresponding wheels of a four-wheel vehicle having a front left wheel, front right wheel, a rear left wheel, and a rear right wheel;

pneumatic pressure drop judging means for judging whether a tire pressure drops, based on the rotational angular velocities calculated by the rotational angular velocity calculating means;

alarm means for generating a signal corresponding to a judgment result output of the pneumatic pressure drop judging means;

operating means for determining a first front/rear ratio of the rotational angular velocities of the left tires and a second front/rear ratio of the rotational angular velocities of the right tires, and determining a time differential value of a difference between the first front/rear wheel ratio and the second front/rear ratio;

one-sided irregular road traveling judging means for judging a traveling condition of the vehicle to determine a variation in road conditions between left and right sides of the vehicle, based on the differential value of the difference between the first front/rear wheel ratio and the second front/rear wheel ratio determined by the operating means when the vehicle is operating under one-sided irregular road traveling conditions, and for generating a judgment result output; and means for inhibiting the pneumatic pressure drop judging means when the one-sided irregular road traveling judging means indicates a variation in road conditions between left and right sides of the vehicle.

6. A tire pressure drop alarm device according to claim 5, wherein the one-sided irregular road traveling judging means comprises means for performing integral processing on the time differential value of the difference in the first front/rear wheel ratio and the second front/rear wheel ratio determined by the operating means to generate a value upon which the traveling condition of the vehicle is judged.

7. A tire pressure drop alarm device according to claim 6, wherein the one-sided irregular road traveling judging means determines a variation in road conditions exists between the left and right sides of the vehicle, when the value generated by the integral processing means is greater than a predetermined threshold value $t_1$; and determines a variation in road conditions does not exist between the left and right sides of the vehicle when the value generated by the integral processing means becomes smaller than a predetermined threshold value $t_2$, wherein $t_1$ is greater than $t_2$.

8. A tire pressure drop alarm device according to claim 5, wherein the one-sided irregular road traveling judging means determines a variation in road conditions exists between the left and right sides of the vehicle, when the time differential value of the difference between the first front/rear wheel ratio and the second front/rear wheel ratio determined by the operating means is greater than a predetermined threshold value $t_1$; and determines a variation in road conditions does not exist between the left and right sides of the vehicle when the time differential value of the difference between the first front/rear wheel ratio and the second front/rear wheel ratio becomes smaller than a predetermined threshold value $t_2$, wherein $t_1$ is greater than $t_2$.

9. A tire pressure drop alarm device, comprising:

rotational angular velocity calculating means for calculating rotational angular velocities of tires provided for corresponding wheels of a four-wheel vehicle having a front left wheel, a front right wheel, a rear left wheel, and a rear right wheel;

pneumatic pressure drop judging means for judging whether a tire pressure drops, based on the rotational angular velocities calculated by the rotational angular velocity calculating means;

alarm means for generating a signal corresponding to a judgment result output of the pneumatic pressure drop judging means;

operating means for determining a first time differential value of a front/rear wheel ratio of the rotational angular velocities of the left tires and a second time differential value of a front/rear wheel ratio of the rotational angular velocities of the right tires, and determining a ratio of the first time differential value and the second time differential value;

one-sided irregular road traveling judging means for judging a traveling condition of the vehicle, to determine a variation in road conditions between left and right sides of the vehicle, based on the ratio of the first time differential value and the second time differential value determined by the operating means when the vehicle is operating under one-sided irregular road traveling conditions, and for generating a judgment result output; and means for inhibiting the pneumatic pressure drop judging means when the one-sided irregular road traveling judging means indicates a variation in road conditions between left and right sides of the vehicle.

10. A tire pressure drop alarm device according to claim 9, wherein the one-sided irregular road traveling judging means comprises means for performing integral processing on the ratio of the first time differential value and the second time differential value determined by the operating means to generate a value upon which the traveling condition of the vehicle is judged.

11. A tire pressure drop alarm device according to claim 10, wherein the one-sided irregular road traveling judging means determines a variation in road conditions exists between the left and right sides of the vehicle, when the value generated by the integral processing means is greater than a predetermined threshold value $t_1$; and determines a variation in road conditions does not exist between the left and right sides of the vehicle when the value generated by the integral processing means becomes smaller than a predetermined threshold value $t_2$, wherein $t_1$ is greater than $t_2$.

12. A tire pressure drop alarm device according to claim 9, wherein the one-sided irregular road traveling judging means determines a variation in road conditions exists between the left and right sides of the vehicle, when the ratio of the first time differential value and the second time differential value determined by the operating means is greater than a predetermined threshold $t_1$; and determines a variation in road conditions does not exist between the left and right sides of the vehicle when the ratio of the first time differential value and the second time differential value becomes smaller than a predetermined threshold value $t_2$, wherein $t_1$ is greater than $t_2$.

13. A tire pressure drop alarm device, comprising:

rotational angular velocity calculating means for calculating rotational angular velocities of tires provided for corresponding wheels of a four-wheel vehicle having a front left wheel, a front right wheel, a rear left wheel, and a rear right wheel;

pneumatic pressure drop judging means for judging whether a tire pressure drops, based on the rotational angular velocities calculated by the rotational angular velocity calculating means;

alarm means for generating a signal corresponding to a judgment result output of the pneumatic pressure drop judging means;

operating means for determining a first front/rear ratio of the rotational angular velocities of the left tires and a second front/rear ratio of the rotational angular velocities of the right tires, and determining a time differential value of a ratio of the first front/rear wheel ratio and the second front/rear ratio;

one-sided irregular road traveling judging means for judging a traveling condition of the vehicle to determine a variation in road conditions between left and right sides of the vehicle, based on the differential value of the ratio of the first front/rear wheel ratio and the second front/rear wheel ratio determined by the operating means when the vehicle is operating under one-sided irregular road traveling conditions, and for generating a judgment result output; and means for inhibiting the pneumatic pressure drop judging means when the one-sided irregular road traveling judging means indicates a variation in road conditions between left and right sides of the vehicle.

14. A tire pressure drop alarm device according to claim 13, wherein the one-sided irregular road traveling judging means comprises means for performing integral processing on the time differential value of the ratio of the first front/rear wheel ratio and the second front/rear wheel ratio determined by the operating means to generate a value upon which the traveling condition of the vehicle is judged.

15. A tire pressure drop alarm device according to claim 14, wherein the one-sided irregular road traveling judging means determines a variation in road conditions exists between the left and right sides of the vehicle, when the value generated by the integral processing means is greater than a predetermined threshold value $t_1$; and determines a variation in road conditions does not exist between the left and right sides of the vehicle when the value generated by the integral processing means becomes smaller than a predetermined threshold value $t_2$, wherein $t_1$ is greater than $t_2$.

16. A tire pressure drop alarm device according to claim 13, wherein the one-sided irregular road traveling judging means determines a variation in road conditions exists between the left and right sides of the vehicle, when the time differential value of the ratio of the first front/rear wheel ratio and the second front/rear wheel ratio determined by the operating means is greater than a predetermined threshold value $t_1$; and determines a variation in road conditions does not exist between the left and right sides of the vehicle when the time differential value of the the first front/rear wheel ratio and the second front/rear wheel ratio becomes smaller than a predetermined threshold value $t_2$, wherein $t_1$ is greater than $t_2$.

* * * * *

UNITED STATES PATENT AND TRADEMARK OFFICE
CERTIFICATE OF CORRECTION

PATENT NO. : 5,604,307
DATED : February 18, 1997
INVENTOR(S) : Akikio IIDA, et. al.

It is certified that error appears in the above-indentified patent and that said Letters Patent is hereby corrected as shown below:

Title page, item [73], Assignee: add --Sumitomo Rubber Industries, Ltd., Hyogo, Japan--.

Signed and Sealed this

Nineteenth Day of October, 1999

Q. TODD DICKINSON

*Attest:*

*Attesting Officer*        *Acting Commissioner of Patents and Trademarks*

UNITED STATES PATENT AND TRADEMARK OFFICE
CERTIFICATE OF CORRECTION

PATENT NO.   : 5,604,307
DATED        : February 18, 1997
INVENTOR(S)  : Akiko IIDA et al.

It is certified that error appears in the above-identified patent and that said Letters Patent is hereby corrected as shown below:

Title page, item [73], Assignee: should read -- Sumitomo Rubber Industries, Ltd., Hyogo, Japan and Sumitomo Electric Industries, Ltd., Osaka, Japan--

This certificate supersedes Certificate of Correction issued October 19, 1999.

Signed and Sealed this

Eighteenth Day of April, 2000

*Attest:*

Q. TODD DICKINSON

*Attesting Officer*     *Director of Patents and Trademarks*